United States Patent [19]
Wilhelmi et al.
[11] 3,878,449
[45] Apr. 15, 1975

[54] HIGH PULSE RATE, HIGH DUTY FACTOR LINE MODULATOR TYPE PULSE GENERATORS

[75] Inventors: Frank A. Wilhelmi, Simi; Ben Ifune, Torrance, both of Calif.

[73] Assignee: Hughes Aircraft Company, Culver City, Calif.

[22] Filed: June 7, 1973

[21] Appl. No.: 367,935

[52] U.S. Cl. .................. 321/15; 307/110
[51] Int. Cl. .................. H02m 7/00
[58] Field of Search .......... 307/106, 108, 109, 110; 321/15; 332/9 R

[56] References Cited

UNITED STATES PATENTS

| | | | |
|---|---|---|---|
| 3,259,829 | 7/1966 | Feth | 321/15 |
| 3,433,977 | 3/1969 | Gagnon et al. | 306/106 |
| 3,539,903 | 11/1970 | Goebel | 321/15 |
| 3,566,150 | 2/1971 | Nollace | 307/108 |
| 3,611,210 | 10/1971 | Theodone | 307/106 X |
| 3,611,211 | 10/1971 | Theodone | 307/106 X |
| 3,662,185 | 5/1972 | Sapir | 321/15 X |
| 3,681,656 | 8/1972 | Mitchell | 307/108 X |

OTHER PUBLICATIONS

Electronics, "Capacitors Add Up in Voltage Multiplier," H. R. Mallory, Mar. 2, 1970, p. 104.

*Primary Examiner*—R. N. Envall, Jr.
*Attorney, Agent, or Firm*—W. H. MacAllister; Lawrence V. Link, Jr.

[57] ABSTRACT

A line modulator type pulse generator in which a plurality of energy storage sections of a pulse forming network are coupled to a resonant type direct current power supply by means of a plurality of unidirectional current conducting devices such that parallel charging of the energy storage sections is provided.

6 Claims, 5 Drawing Figures

HIGH PULSE RATE, HIGH DUTY FACTOR LINE MODULATOR TYPE PULSE GENERATORS

BACKGROUND OF THE INVENTION

This invention relates generally to pulse generators and more particularly to line modulator type pulse generators suitable for high pulse rate, high duty factor applications.

In applications requiring high energy pulses, such as required for modulation of radar transmitter tubes, for example, line modulators have been widely used because of their overall efficiency and reliability. In this type of pulse generator, a pulse forming network comprising a plurality of inductance — capacitance energy storage sections is charged from a direct current supply through a charging choke which resonates with the capacitance of the pulse forming network at a frequency equal to or greater than the pulse repetition frequency of the generator. Heretofore the charging current has been applied to a single pair of input terminals of the pulse forming network, and a sufficient delay period is allowed so that the entire network is fully charged before it is discharged in the load circuit. The output pulse's waveform is substantially effected by the state of charge of the various energy storage sections of the pulse forming network.

For low pulse rates and duty factors applications the charging choke is very large compared to the inductance of the pulse forming network, and the fact that the pulse forming network charges in steps equal in length to twice the network time delay is of no consequence. However, as the time allowed to charge the network approaches the network's time delay (high duty factor applications), the final state of the capacitor voltages become more unpredictable; and a nonuniform charge on the sections of the network can result in severe output pulse distortion.

SUMMARY OF THE INVENTION

A primary object of the subject invention is to provide an improved line modulator type pulse generator capable of operating at high pulse rates and duty factors.

A further object is to provide an improved line modulator type pulse generator in which the charging current is applied in a preselected timing order to various sections of the pulse forming network so as to allow for a more optimum charging current waveform, i.e. a lower peak to average charging current ratio.

Briefly the subject invention relates to line modulator type pulse generators in which a pulse forming network is charged from a resonant type direct current voltage supply and a switching circuit is coupled to the output of the pulse forming network for periodically applying the energy stored in the pulse forming network to a load circuit. The invention is characterized by including a plurality of unidirectional current conducting devices for coupling the voltage supply to the pulse forming network so as to provide separate unidirectional current paths to preselected energy storage sections of the pulse forming network; whereby uniform charging of the various sections is achieved, even at high pulse rate and high duty factor operation. According to one embodiment of the invention each of the unidirectional current conducting devices is a diode or a string of diodes. In accordance with a second embodiment of the invention each of the unidirectional current conducting devices is a silicon controlled rectifier (or a string of such units) controlled so that various ones of the devices are conductive during different time periods; whereby the waveform of the charging current applied to the pulse forming network may be shaped, e.g. to enhance the average to peak charging current ratio.

BRIEF DESCRIPTION OF THE DRAWINGS

The novel features which are characteristic of the invention both as to its organization and method of operation, together with further objects and advantages thereof, will be better understood from the following description considered in connection with the accompanying drawings in which like characters refer to like parts and in which.

DESCRIPTION OF THE PREFERRED EMBODIMENTS

Figure 1:
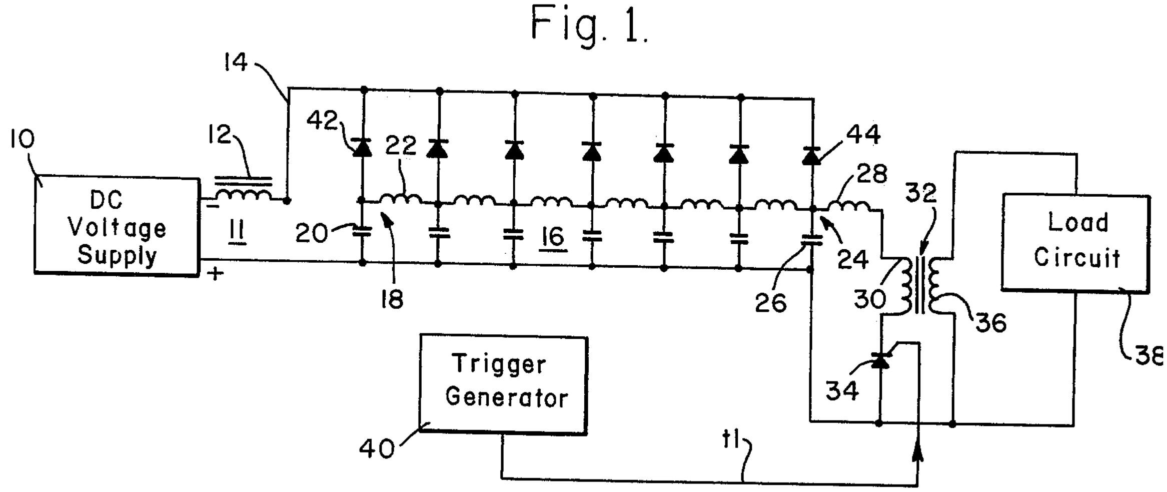
FIGS. 1 through 4 are each block and schematic diagrams of a different embodiment of a pulse generator in accordance with the subject invention.

Referring first to a pulse generator in accordance with the invention as shown in FIG. 1, a resonant type voltage supply circuit 11 includes a direct current voltage supply 10 which has its negative output terminal coupled through a charging choke 12 to a lead 14. The positive terminal of voltage supply 10, sometimes hereinafter referred to as the first output terminal of voltage supply circuit 11, is connected to the lower terminal of each of the capacitors of a pulse forming network 16.

As shown in FIG. 1, pulse forming network 16 includes seven energy storage sections, each of which comprises a capacitance element and an inductance element. For example, the first energy storage section on the left in FIG. 1 is designated by the reference numeral 18 and includes a capacitor 20 and an inductor 22; and the last section on the right of pulse forming network 16 is designated by reference numeral 24 and includes a capacitor 26 and an inductor 28. The top terminals of each of the capacitors of pulse forming network 16 are coupled through an associated unidirectional current device to lead 14. Lead 14 is coupled to the right end terminal of charging choke 12, which terminal is sometimes hereinafter referred to as the second output terminal of voltage supply circuit 11. In the embodiment of FIG. 1, the unidirectional current devices are shown as a different diode associated with each of the capacitors of pulse forming network 16. For example, diode 42 is primarily operative for charging capacitor 20 of section 18 and diode 44 for charging capacitor 26 of section 24.

The lower terminal of capacitor 26 and the right-hand terminal of inductor 28 are sometimes hereinafter referred to as the output terminals of pulse forming network 16; and these output terminals are coupled in series with a primary winding 30 of a pulse transformer 32, and with the anode-cathode current path of a silicon controlled rectifier (SCR) 34. A secondary winding 36 of transformer 32 is coupled in series with a load circuit 38; and when SCR 34 is triggered into conduction by a trigger pulse t1 supplied from a trigger generator unit 40 energy stored in pulse forming network 16 is applied to load circuit 38.

Figure 5:
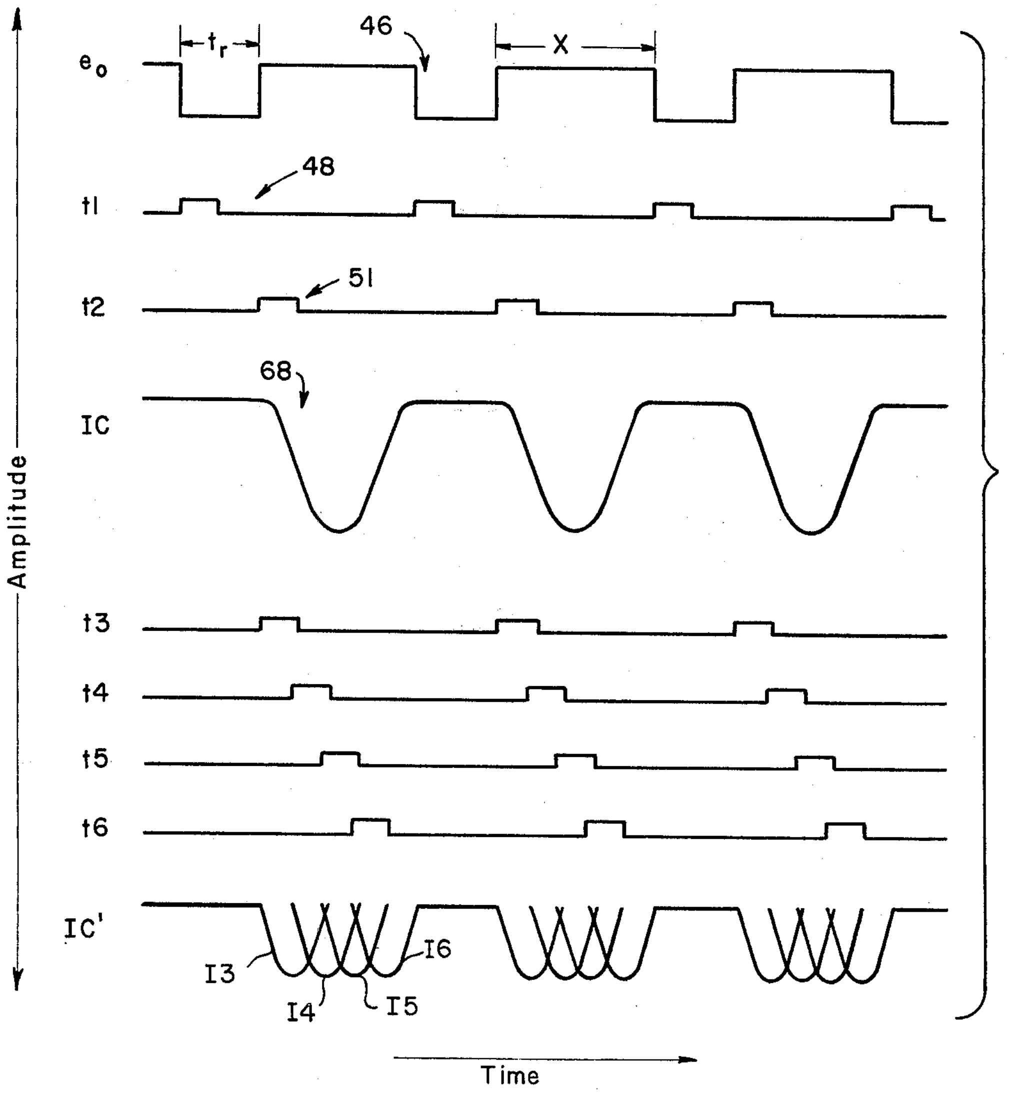
FIG. 5 is a diagram of signal amplitudes versus time which is useful for explaining the operation of the pulse generators of FIGS. 1–4.

In the operation of the pulse generator of FIG. 1, pulse forming network 16 is resonant charged through charging choke 12 during the interpulse period X, see waveform 46 of FIG. 5. The inductance of charging choke 12 is selected to resonate with the capacitance of pulse forming network 16 at a frequency equal to or greater than the pulse repetition frequency of the pulse generator. As noted hereinabove, it is important that a uniform charge be stored in each of the sections of the pulse forming network and line modulator type pulse generators have not heretofore been used in high pulse repetition, high duty factor applications because of the charging time limitation. This just mentioned limitation of prior art line modulators is discussed in the first complete paragraph on page 7-72 of the text "Radar Handbook" by Merrill Skolnik, published in 1970 by McGraw-Hill Book Company, New York, N.Y. In accordance with the subject invention the use of line type modulators at high repetition rates and high duty factors is made possible by the technique wherein the charging of a plurality of sections of the pulse forming network is accomplished through a plurality of unidirectional current conducting devices, such as diodes 42 and 44, for example.

After the pulse forming network is charged, SCR 34 is triggered in response to a pulse t1 applied to the gate terminal thereof and the energy stored in the pulse forming network is applied through transformer 32 to the load circuit 38. Trigger generator 40 could include a stable oscillator such as might be incorporated in the timing section of a radar system, for example; and load circuit 38 could comprise a radar transmitter tube such as a klystron or a magnetron, for example.

The output pulses $e_0$ (negative polarity) which are applied to the load circuit 38 are shown in waveform 46 of FIG. 5; and the trigger pulses t1 applied to SCR 34 are shown in waveform 48 of FIG. 5. It is noted that the amplitudes of the signals of FIG. 5 are not necessarily shown to scale.

The additional capacitance of the diodes such as 42 and 44, for example, has been found to cause only minor changes in the output pulses $e_0$ (FIG. 5). The use of ultrafast recovery diodes is recommended; and it is noted that although in order to maintain the clarity of FIG. 1 only a single diode is shown in each of the unidirectional charging current paths, but that a series string of enough diodes to withstand the desired working voltage should be employed. It is also noted that the current requirement of each of the diodes of FIG. 1 is reduced by the number of charging current paths implemented.

Figure 2:
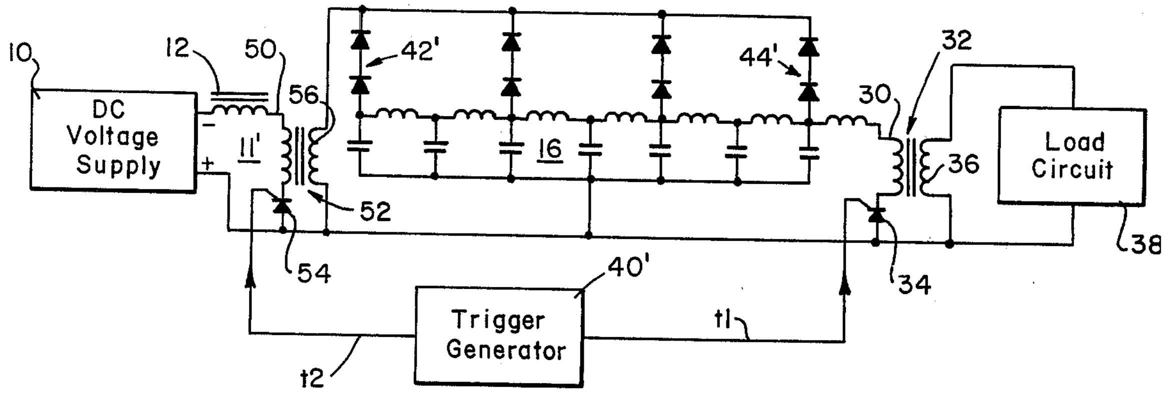

Referring now primarily to the embodiment of FIG. 2, in the pulse generator there shown the pulse forming network and the output circuit switching means (32 and 34) for applying the energy stored in the pulse forming network to load circuit 38, are substantially the same as corresponding parts described hereinabove relative to FIG. 1. In FIG. 2 the voltage supply circuit 11' includes DC voltage supply 10 coupled in series with charging choke 12, the primary winding 50 of a transformer 52 and the anode-cathode current path of an SCR 54. A secondary winding 56 of transformer 52 has a lower terminal coupled to the lower terminal of each of the capacitors of pulse forming network 16; and the upper terminal of transformer winding 56 is connected to lead 14. The lower terminal of winding 56 is sometimes hereinafter referred to as the first output terminal of voltage supply circuit 11'; and the upper terminal of winding 56 as the second output terminal of circuit 11'. SCR 54 is triggered during the first portion of the interpulse period X (see waveform 46 of FIG. 5) by trigger pulses t2 (see waveform 51 of FIG. 5) applied from trigger generator 40'. Trigger pulses t2 could be produced within trigger generator 40' by any suitable means for delaying pulses $t1$ for the width of the output pulse $t_r$, or by means for sensing the trailing edge of the pulses $e_0$. The voltage supply circuit 11' of FIG. 2 provides improved efficiency and reduces the probability of reverse charging current, i.e. energy transfer from network 16 to the power supply circuit. Such reverse current could occur if during the discharge time of the pulse forming network certain types of oscillations occur in the voltage supply circuit; and the arrangement 11' decreases the tendency for these oscillations.

In the embodiment of FIG. 2, every other section of pulse forming network 16 is coupled to the voltage supply circuit 11' through unidirectional charging current conducting devices such as diode strings 42' and 44'. As noted hereinabove the number of diodes in each string should be sufficient to withstand the desired working voltage. By only coupling every other section of the pulse forming network to the voltage supply circuit 11', the complexity of the system is reduced while still maintaining acceptable performance for many applications.

Figure 3:
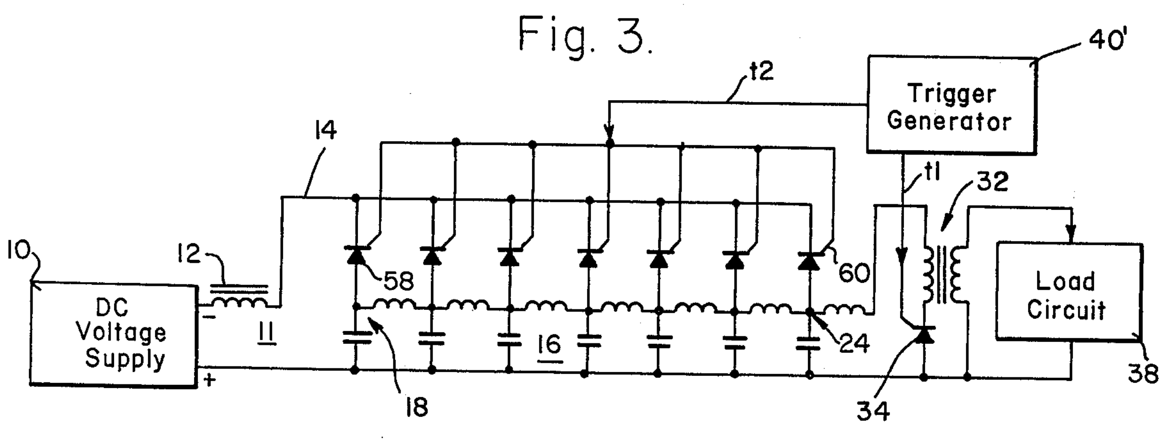

Referring now primarily to FIG. 3, the circuit there shown differs from that discussed above relative to FIG. 1 in that the diodes of FIG. 1 are replaced by SCR devices, such as 58 and 60, in the embodiment of FIG. 3; and each of these SCR devices is enabled by trigger pulses $t2$ applied from a trigger generator 40'. The embodiment of FIG. 3 has the advantage of insuring that reverse charging current does not flow during the output pulse periods; i.e. the SCRs turn off if their cathodes are less negative than their anodes and stay off until retriggered. The disadvantages of the configuration of FIG. 3 are an increase in cost and complexity especially for high speed, high voltage applications where series strings of high speed SCRs are required. It is noted that although in the interest of maintaining the clarity of FIG. 3 only one SCR device is shown in each current charging path, but that series strings of SCRs should be used where necessary to provide compatibility with the desired working voltage.

Figure 4:
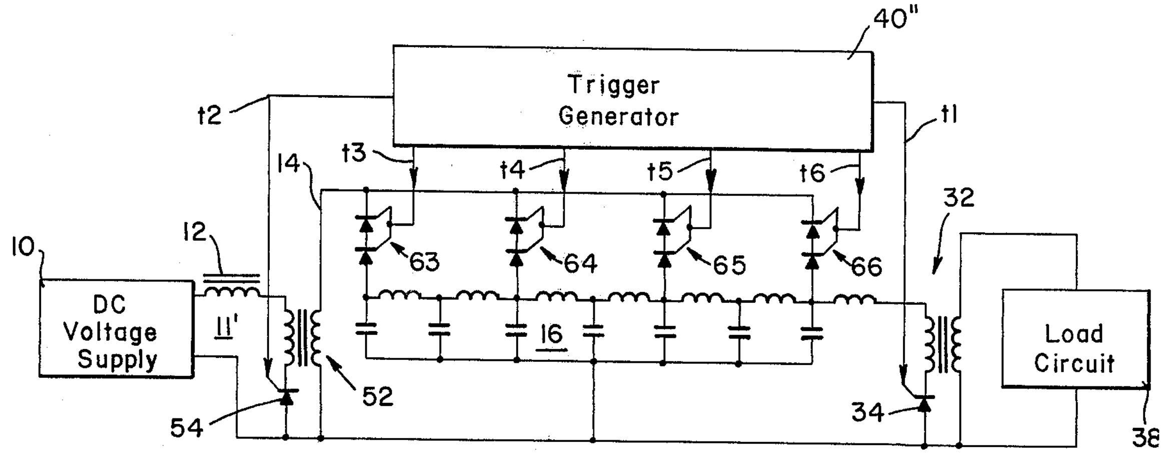

Referring now primarily to FIG. 4, the pulse generator there shown is similar in structure and operation to that discussed hereinabove relative to FIG. 2, with the following exceptions. The diode strings, such as 42' and 44' of FIG. 2, are replaced in the embodiment of FIG. 4 with strings of SCRs 63 through 66; and each of these SCR strings is individually enabled by trigger pulses $t3$, $t4$, $t5$ and $t6$, respectively, supplied from trigger generator 40''. Trigger pulses $t4$, $t5$ and $t6$ could be produced within trigger generator 40'' by the use of any suitable delay arrangement (analog or digital) whereby pulses $t2$ which gate SCR 54 are delayed by the desired time interval required to produce the timing pulses $t4$, $t5$ and $t6$ as shown in FIG. 5, for example. It is noted that trigger pulse t3 could be the same signal as trigger pulse $t2$ but is shown as a separate signal in FIGS. 4 and 5 for clarity of the explanation of the operation of the circuits associated with SCRs 63 through 66.

The operation of the pulse generator of FIG. 4 may be better understood by considering the charging current IC associated with the embodiments of FIGS. 1 through 3 relative to the charging current IC' for the embodiment of FIG. 4. As shown in FIG. 5, the waveform of the charging current IC is similar to one-half cycle of a sinusoid while the composite current of SCR 63 through 66 (see waveform IC') is less sinusoidal and more rectangular. It is noted that in the waveform IC' of FIG. 5 that for clarity of the explanation the currents I3, I4, I5 and I6 which are associated with SCRs 63, 64, 65 and 66, respectively, are shown separately so that the significance of the sequential triggering of these SCRs may be more clearly illustrated. Also relative to FIG. 5 it is noted that exactness in the waveforms IC and IC' is not intended; but that these waveforms are presented to illustrate the concept that by sequentially triggering SCRs 63 through 66 the waveform of the charging current to the pulse forming network 16 may be shaped. For example, the ratio of peak charging current to its average value can be reduced so as to lessen the requirements on the DC voltage supply 10.

Thus there has been described a new and useful line modulator type pulse generator capable of operating at high pulse rates and duty factors; and which is adaptable for waveform shaping of the charging current to the pulse forming network.

What is claimed is:

1. A line modulator type pulse generator for applying pulses of electrical energy to a load circuit, said generator comprising: a pulse forming network adapted for storing electrical energy and having a plurality of capacitance elements intercoupled by a plurality of inductance elements such that first terminals of each of said capacitance elements are interconnected, and second terminals of said capacitance elements are intercoupled through said inductance elements so as to form a plurality of energy storage stages with each energy storage stage comprising one of said capacitance elements; voltage supply means for resonant charging said pulse forming network, said voltage supply means including a pair of output terminals with one of said output terminals connected to said first terminals of said capacitance elements; switching means coupled across one of said energy storage stages for periodically applying energy from said pulse forming network to the load circuit; and wherein the improvement comprises a plurality of unidirectional current conducting devices coupled between said pulse forming network and said voltage supply means such that the second terminal of each one of a preselected plurality of said capacitance elements is coupled through an associated unidirectional current conducting device to the other output terminal of said voltage supply means.

2. The pulse generator of claim 1 wherein each of said unidirectional current conducting devices comprises at least one diode.

3. The pulse generator of claim 1 wherein each of said unidirectional current conducting devices comprises at least one silicon controlled rectifier.

4. The pulse generator of claim 1 wherein said voltage supply means includes a direct current potential source series coupled with a charging choke.

5. The pulse generator of claim 1 wherein said voltage supply means includes a series coupled arrangement of a direct current potential source, a charging choke, a primary winding of a transformer and a switching device; and a secondary winding of said transformer coupled to said output terminals of said voltage supply means.

6. A line modulator type pulse generator for applying pulses of electrical energy to a load circuit, said generator comprising: a pulse forming network adapted for storing electrical energy and having a plurality of capacitance elements interconnected by a plurality of inductance elements; voltage supply means for resonant charging said pulse forming network, said voltage supply means including a pair of output terminals with one of said output terminals coupled to one terminal of each of said capacitance elements; switching means for periodically applying energy from said pulse forming network to the load circuit; and wherein the improvement comprises a plurality of unidirectional current conducting devices coupled between said pulse forming network and said voltage supply means such that the other terminal of each one of a preselected plurality of said capacitance elements is coupled through an associated unidirectional current conducting device to the other output terminal of said voltage supply means; and wherein said unidirectional current conducting devices comprise at least two silicon controlled rectifiers; and said pulse generator comprises means for sequentially applying trigger pulses to the gate terminals of said silicon controlled rectifiers so as to cause various ones of said silicon controlled rectifiers to be conductive during different time periods.

* * * * *